United States Patent [19]
Dutra, Jr.

[11] Patent Number: 5,553,824
[45] Date of Patent: Sep. 10, 1996

[54] ADJUSTABLE LENGTH LAPTOP COMPUTER TRAY ASSEMBLY

[76] Inventor: Joseph G. Dutra, Jr., 4568 Thornton Ave., Fremont, Calif. 94536-5662

[21] Appl. No.: 283,813

[22] Filed: Aug. 1, 1994

[51] Int. Cl.⁶ ................................................ A47G 29/00
[52] U.S. Cl. .................... 248/346.07; 248/924; 248/448; 211/43; 108/93
[58] Field of Search ..................................... 248/346, 924, 248/917, 918, 442.2, 448, 149, 178, 678, 444; 211/43; 108/43, 44, 93; 312/205

[56] References Cited

U.S. PATENT DOCUMENTS

| | | | |
|---|---|---|---|
| 241,387 | 4/1881 | Loomis . | |
| 297,219 | 5/1884 | Anthony . | |
| 779,262 | 1/1905 | Burke | 211/43 |
| 1,121,422 | 12/1914 | Tydings . | |
| 1,257,843 | 2/1918 | Gonyea | 108/93 |
| 1,321,812 | 11/1919 | Drumm | 248/346.4 |
| 1,613,440 | 1/1927 | Carek . | |
| 1,682,060 | 8/1928 | Banks | 211/43 |
| 2,545,844 | 3/1951 | Cougias | 211/43 |
| 3,061,969 | 11/1962 | Lunday | 248/448 |
| 4,700,634 | 10/1987 | Mills et al. | 108/43 |
| 4,765,583 | 8/1988 | Tenner | 248/444 |
| 4,852,498 | 8/1989 | Judd | 108/43 |
| 5,038,688 | 8/1991 | Permenter | 248/444 |
| 5,137,160 | 8/1992 | Santucci | 211/175 |
| 5,143,341 | 9/1992 | Juster | 248/444 |
| 5,263,423 | 11/1993 | Anderson | 108/43 |

FOREIGN PATENT DOCUMENTS 46663  12/1932  Denmark ................................. 108/44

*Primary Examiner*—Karen J. Ohotkowski
*Assistant Examiner*—Anita M. King
*Attorney, Agent, or Firm*—Flehr, Hohbach, Test, Albritton & Herbert

[57] ABSTRACT

A portable computer tray assembly (20) which includes a relatively thin, structurally rigid and length adjustable support surface (27) to accommodate and support a variety of portable computers (33) thereatop. The computer tray assembly (20) includes a relatively thin platform member (21) having a plurality of shallow strengthening ribs (23) laterally spaced-apart thereacross. Further, a relatively thin support member (24) is positioned adjacent and in abutting contact with the platform member (21), and includes a plurality of shallow support ribs (26) laterally spaced-apart across the support member. These support ribs (26) are formed for sliding interengagement with the strengthening ribs (23) of the platform member (21) to provide sliding interengagement therebetween to lengthen the support surface (23) which is aggregately formed by the platform member (21) and the support member (24). The interengagement between the ribs (23, 26) further substantially prevents lateral motion of the support member (24) relative the platform member (21). The support surface (27) further includes an upstanding first lip (30) and an opposite upstanding second lip (31) to retain a portable computer (33) therebetween.

24 Claims, 4 Drawing Sheets

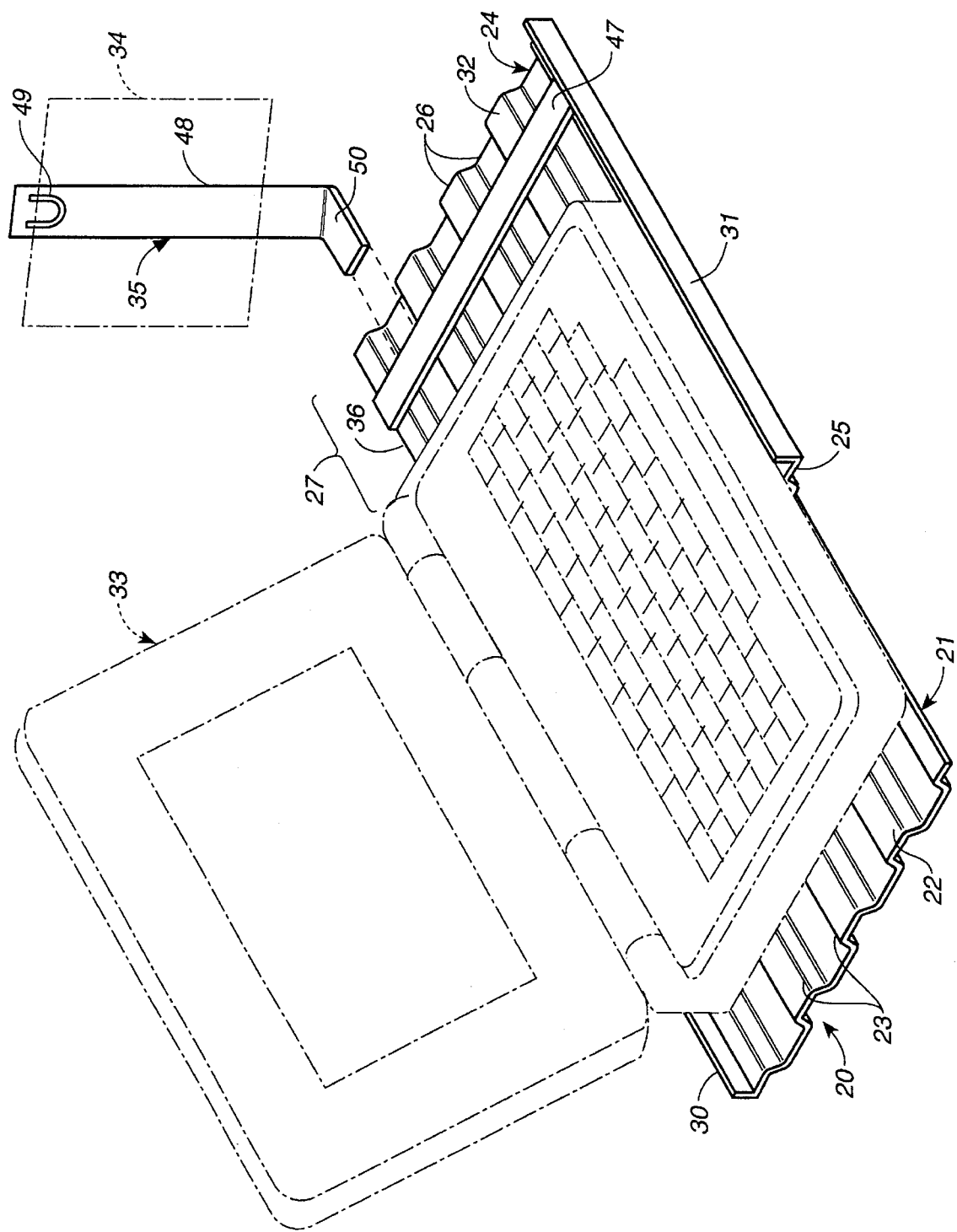
FIG._1

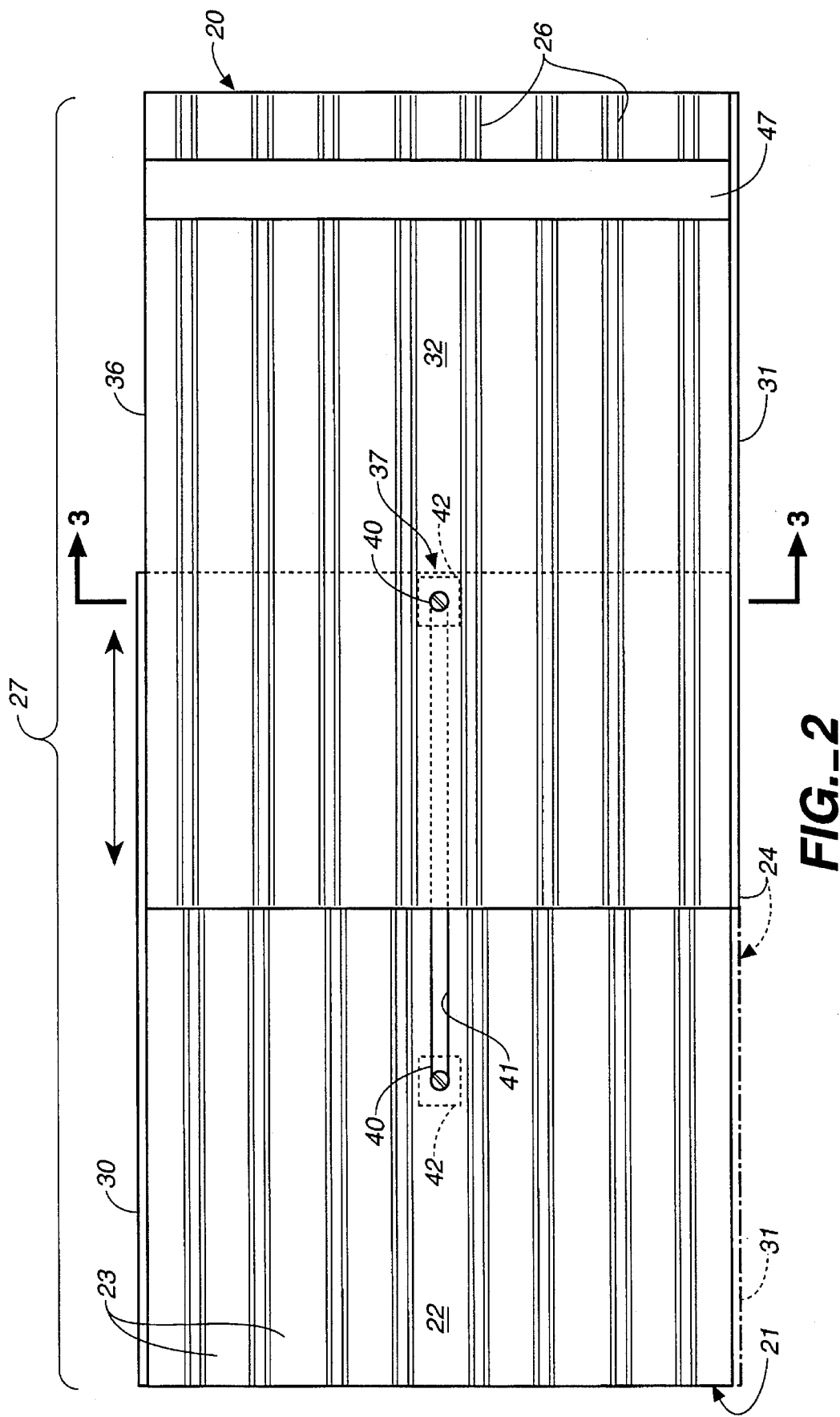
FIG._2

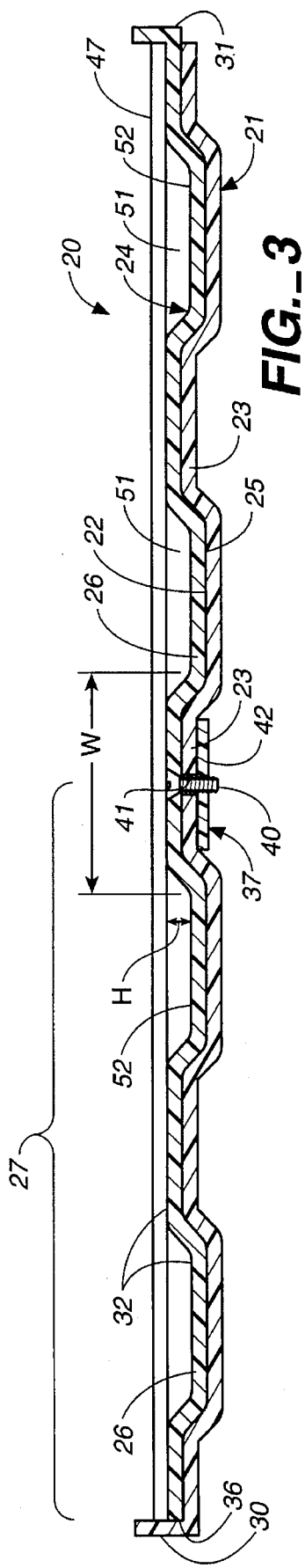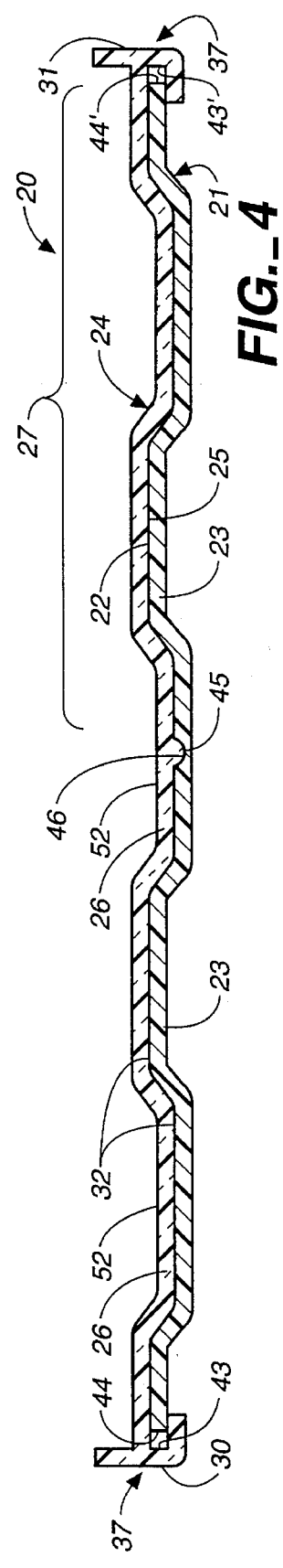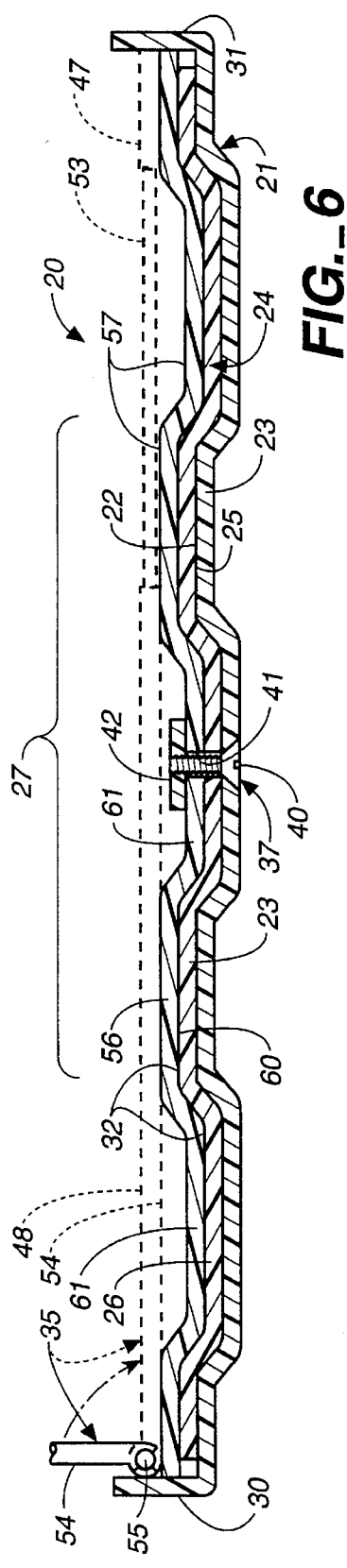

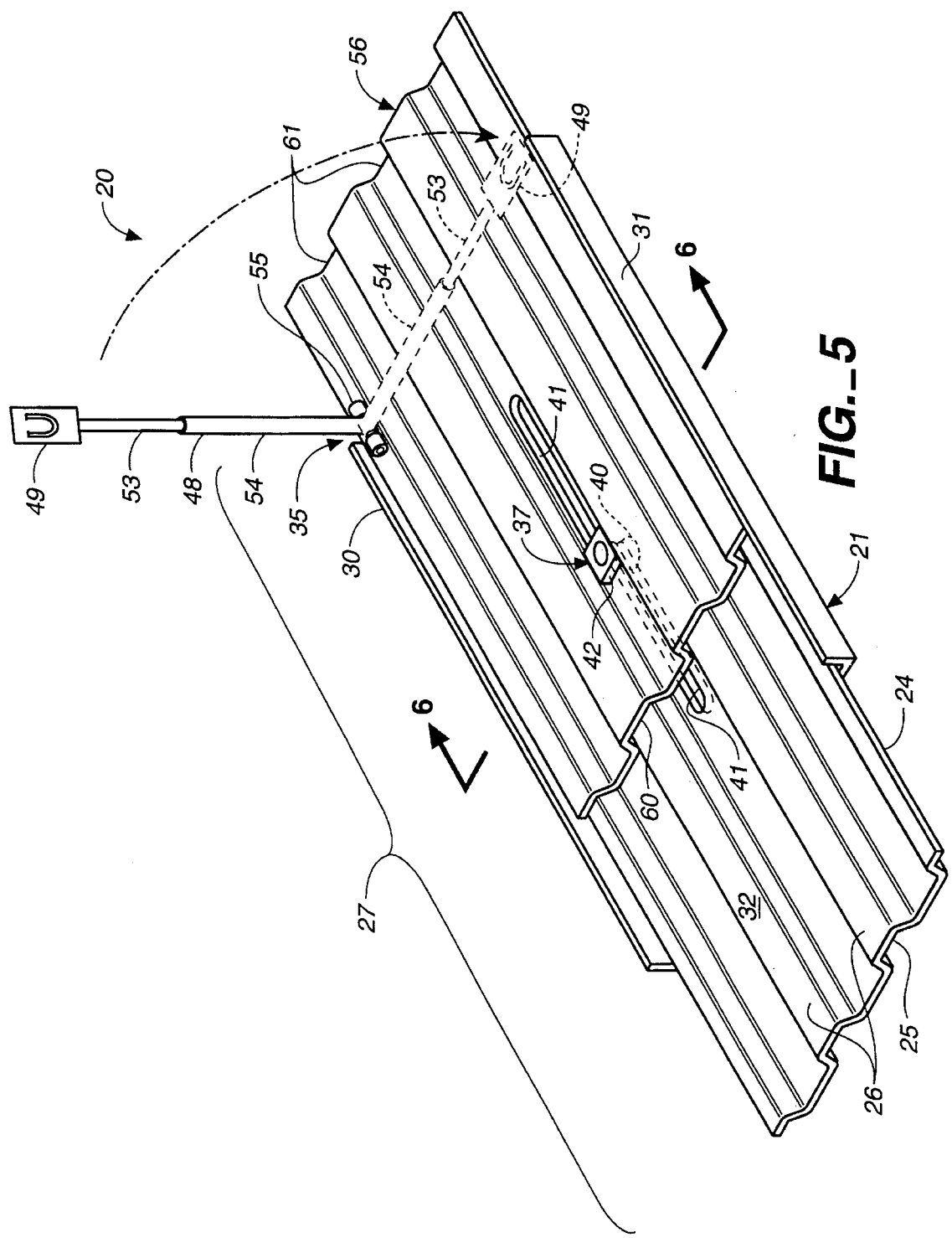
FIG._5

ADJUSTABLE LENGTH LAPTOP COMPUTER TRAY ASSEMBLY

TECHNICAL FIELD

The present invention relates, generally, to lap tray assemblies and, more particularly, relates to adjustable length laptop computer trays.

BACKGROUND ART

While laptop computers have become more convenient due in part to their reduced size, greater portability and lighter weight, they also have become more difficult to balance and use on the operator's lap. Recent designs have reduced the base of the laptop computers to a size which sometimes cannot be supported between or span the operator's two legs. Hence, one always feels wary of dropping the computer from their lap, particularly when typing entries on the integral keyboard. Often the user must hold his or her knees together in a way that is rather tense and stressful during support of the computer. Moreover, because the range of motion of the operator is severely limited when the laptop computer is supported on their lap, typing from documents and/or making handwritten notes is often very awkward, and sometimes requires removal of the computer onto other supporting surfaces to complete such tasks.

Portable desk units are widely available which include a generally planar working surface upon which a laptop or portable computer may be operably supported. These units, however, often require deployment or unfolding of the unit for access to the working surface. Moreover, many of these portable desk units are generally too bulky and awkward for support on an operator's lap. Typical of these patented portable desks are disclosed in U.S. Pat. Nos. 241,387; 1,121,422; 1,613,440; 4,700,634; 4,765,583 and 5,143,341.

Recently, portable computer work stations or lapboards have been developed which are specifically suited to support laptop computers thereatop. For example, U.S. Pat. No. 4,852,498 discloses a lap top computer work station which unfolds to provide a diskette holder, a computer support surface, and a pad display. This assembly, however, is fairly complex to manufacture and requires a degree of assembly or set-up before use. Further, the length of the computer support surface is not adjustable so that not all laptop computers can be accommodated thereon due to the wide variety of sizes and shapes of the computers.

Another example of a portable computer lap support is U.S. Pat. No. 5,263,423, which discloses a table member mounted to a pair of in-folding leg members which are adapted to secure around the operator's leg for mounting. Each time the operator is required to set aside the computer support, however, the straps must be undone from his or her leg, and then restrapped before use. This task becomes laborious after repetitive use. Moreover, similar to the U.S. Pat. No. 4,852,498 patent, the table member is non-adjustable in length which makes it unsuitable to support some laptop computers. Some lap boards are equipped with length adjusting features such as U.S. Pat. No. 297,219 which discloses a lap board having side leaves which are formed to slide outwardly longitudinally along a main piece. While the length of the board is adjustable, the mechanism only provides lateral support along one edge of the side leave. Moreover, the substantially flat and relatively thin main board piece and side leaves are structurally unsupported, and are susceptible to breakage.

DISCLOSURE OF INVENTION

Accordingly, it is an object of the present invention to provide a tray for a laptop computer which will support the computer on the user's lap in a manner which is more relaxed and is suitable for support of other documents or note pads, calculators and the like.

Another object of the present invention is to provide a lap tray assembly which is adjustable in length to accommodate a wide variety of different sized and shaped laptop computers.

Still another object of the present invention is to provide a laptop computer tray assembly which has increased strength, while maintaining a relatively thin profile.

Yet another object of the present invention is to provide a laptop computer tray assembly which is lightweight.

It is a further object of the present invention to provide a laptop computer tray assembly which is durable, compact, easy to construct and maintain, has a minimum number of components, and is easy to use by unskilled personnel.

In accordance with the foregoing objects, the present invention includes a portable computer tray which has a support surface capable of length adjustment to accommodate different sized and shaped laptop computers. Briefly, the computer tray assembly comprises a relatively thin platform member having a contacting surface forming a plurality of relatively shallow strengthening ribs laterally spaced-apart across the platform member and which extend longitudinally therealong. The present tray assembly further includes a relatively thin support member having a sliding surface forming a plurality of shallow support ribs laterally spaced-apart across the support member. These support ribs are formed for sliding interengagement with the strengthening ribs of the platform member in a manner substantially preventing lateral motion of the support member laterally along the platform member. Further, this sliding interengagement provides longitudinal sliding support for selective positioning of the support member relative the platform member between a retracted position and an extended position such that the platform member and the support member aggregately cooperate to provide a substantially flat, length adjustable support surface. A first flange and an opposite second flange each extend upwardly from the support surface, and each extends longitudinally along one of the platform member and the support member on opposed sides of the support surface.

BRIEF DESCRIPTION OF THE DRAWING

The assembly of the present invention has other objects and features of advantage which will be more readily apparent from the following description of the Best Mode of Carrying Out the Invention and the appended claims, when taken in conjunction with the accompanying drawing, in which:

FIG. 1 is a top perspective view of a length adjustable portable computer tray assembly constructed in accordance with the present invention and having a laptop computer supported thereon.

FIG. 2 is a top plan view of the portable computer tray assembly of FIG. 1 and illustrating the length adjustable support surface between the retracted position and the extended position.

FIG. 3 is an enlarged side elevation view of the portable computer tray assembly taken substantially along the plane of the line 3—3 in FIG. 2, and illustrating the coupling mechanism.

FIG. 4 is an enlarged side elevation view, in cross-section, of an alternative embodiment portable computer tray assembly.

FIG. 5 is a top perspective view of another alternative embodiment of the length adjustable portable computer tray assembly of the present invention having two slidable sheet-like support members.

FIG. 6 is an enlarged side elevation view, in cross-section, of the alternative embodiment portable computer tray assembly taken substantially along the plane of the line 6—6 in FIG. 5, and showing pivotal movement of a document holding arm.

BEST MODE OF CARRYING OUT THE INVENTION

While the present invention will be described with reference to a few specific embodiments, the description is illustrative of the invention and is not to be construed as limiting the invention. Various modifications to the present invention can be made to the preferred embodiment by those skilled in the art without departing from the true spirit and scope of the invention as defined by the appended claims. It will be noted here that for a better understanding, like components are designated by like reference numerals throughout the various figures.

The present invention provides a portable computer tray assembly having a relatively thin, structurally rigid and length adjustable support surface which eliminates many of the problems associated with the prior art assemblies. FIGS. 1–3 illustrate the present computer tray assembly, generally designated 20, which includes a relatively thin platform member 21 having a contacting surfaces 22, bounded by a plurality of relatively shallow strengthening ribs 23, laterally spaced-apart across the platform member 21. These surfaces 22 and strengthening ribs 23 further extend longitudinally along platform member 21 from one side to an opposite side thereof. The present tray assembly 20 further includes a relatively thin support member 24 positioned adjacent and in abutting contact with platform member 21, and having a sliding surface 25 bounded by a plurality of shallow support ribs 26 laterally spaced-apart across the support member. These support ribs 26 are formed for sliding interengagement with strengthening ribs 23 of platform member 21 in a manner substantially preventing lateral motion of the support member laterally along the platform member. Further, this sliding interengagement provides longitudinal sliding support for selective placement of support member 24 relative platform member 21 between a retracted position (phantom lines in FIG. 2) and an extended position (solid lines in FIG. 2) such that the platform member and the support member aggregately cooperate to provide a substantially flat, length adjustable support surface 27. An upstanding first lip 30 and an opposite upstanding second lip 31 each extend upwardly from support surface 27, and each extends longitudinally along one of platform member 21 and support member 24 on opposed sides of the support surface.

In the preferred form, these opposing and interengaging ribs (i.e., strengthening ribs 23 and support ribs 26 which are depth exaggerated in FIGS. 1 and 5) are generally shallow relative the surface area of the sheet-like platform member and sheet-like support member. In other words, as best shown in FIG. 2, the ratio between the height (H), from the valley to the peak of one support rib 26 (and the strengthening rib), and the width (W), of the support rib (and the strengthening rib), (H:W), is relatively small. Accordingly, because the peaks of the contacting surface strengthening ribs 23, and those of and the ribbed topside surface 32 of support member 24 (i.e., opposite sliding surface 25 and forming a portion of support surface 27) are substantially planar, the aggregate support surface 27 is relatively flat to enable sufficient support for a laptop computer 33 (phantom lines in FIG. 1) thereon.

These interengaging ribs provide sliding support for movement of the support surface between the retracted position and the extended position to increase the overall length thereof. The extension of the support surface may be provided by sliding movement of the support member relative the platform member in either direction. This arrangement enables ease of use by either right or left handed persons.

FIG. 3 illustrates that sliding surface 25 of support member 24 is the mirror image of opposing contacting surface 22 of platform member 21 so that relative movement therebetween can only occur in the longitudinal direction of the mated ribs. Accordingly, this structural configuration prevents lateral movement of support member 24 relative platform member 21 (i.e., relative movement therebetween in directions perpendicular to the ribs).

Moreover, both strengthening ribs 23 and support ribs 26 provide increased structural integrity for the relatively thin, sheet-like platform member 21 and support member 24. Hence, the thickness of the members, preferably fabricated from plastic or other lightweight, rigid material, may be reduced while still providing the same structural integrity as thicker non-ribbed, sheet-like members.

In the retracted position (phantom lines in FIG. 2), the tray assembly of the present invention preferably is about the size of a laptop computer's base for compact storage and transport with the computer, and in some cases in the computer carrying case. Either the platform member or the support member is slightly longer than the other to facilitate gripping of an edge of the longer sheet-like member so that the tray length can be extended.

When the tray is in the extended position (solid lines in FIG. 2), assembly 20 allows the user to separate his or her legs to a comfortable position for support of the computer and tray thereon. One can shift their legs under the tray periodically to avoid tension buildup without fear of dropping the computer and tray. The tray assembly 20, moreover, is wide enough so that other objects, such as documents 34, can be placed on the tray and/or a document holding device, generally designated 35. As will be discussed in greater detail below, holding device 35 situates document 34 in an elevated position for ease of copying.

FIGS. 1 and 3 best illustrate that an upstanding first lip 30 is provided along one side of tray assembly 20, and that a similar opposing, upstanding second lip 31 is provided along an opposite side of the tray assembly. These lips provide an edge which insures that computer 33 will be retained on the tray, even when the tray is somewhat sloped or tilted. Second lip 31 engages the lower edge of computer 33 and prevents it from sliding toward the user, while the opposite first lip 30 prevents movement of the computer in the opposite direction.

In the preferred embodiment, as shown in FIGS. 1 and 2, one of the lips upstand from platform member 21 while the other lip upstands from support member 24. In this configuration, additional guidance to support member 24 is provided as one edge 36 thereof slides along first lip 30 between the retracted and extended positions. It will be appreciated, however, that either support member 24 or platform member 21 could include both the first lip and the second lip without departing from the true spirit and nature of the present invention. This is clearly illustrated in the embodiment of FIG. 4, to be discussed further below, where both lips upstand from a upper support member 24.

The tray assembly of the present invention further includes a coupling mechanism 37 (FIGS. 2 and 3) formed to slidably join support member 24 to platform member 21 to prevent relative vertical separation therebetween. Coupling mechanism 37 preferably includes a counter-sunk head screw 40 seated in a counter-bore hole formed in the ribbed topside surface 32 of support member 24. The shaft of screw 40 is slidably received in an elongated slot 41 situated longitudinally along platform member 21 which enables sliding movement of support member 24 between the retracted position and the extended position. A retaining nut 42 threadably mates with the shaft of screw 40, forming a T-shaped coupling mechanism, which is slidably supported along an underside surface of platform member 21 in a valley or recess of one of strengthening ribs 23. Coupling mechanism 37, of course, could be oriented in a reverse manner, as clearly viewed in FIGS. 5 and 6.

FIG. 4 illustrates an alternative embodiment of coupling mechanism 37 which is provided by a pair of opposed edge receiving slots 43, 43' situated beneath first lip 30 and second lip 31, respectively. Incidently, in this configuration, support member 24 includes both lip portions upstanding from topside surface 32. Edge receiving slots 43, 43' extend longitudinally along support member 24 in the longitudinal direction of the ribs. Each receiving slot is formed and dimensioned for sliding receipt of the opposed side edges 44, 44' of platform member during relative sliding movement of the support member and the platform member between the retracted and extended positions.

Further, this embodiment may include an elongated detent 45 and opposing elongated groove 46 formed for sliding receipt of detent 45 for aligned sliding movement between the retracted and extended positions. The detent and recess may be formed in either the platform member contacting surface or the support member sliding surface.

As mentioned, an optional document holding device 35 may be provided which is formed to grip and suspend a document 34 (in phantom lines in FIG. 1) during keyboard use. Holding device 35 preferably includes a bridge member 47 mounted to and extending laterally across the peaks of support ribs 26 of support surface 27 between first lip 30 and second lip 31. A holding arm 48 includes an upper end having a clip portion 49 formed to grip document 34 or the like, while a lower end thereof forms a foot portion 50 dimensioned to removably coupled to bridge member 47 to position holding arm 48, and hence, document 34, in an upstanding position.

FIG. 3 best illustrates that foot portion 50 is dimensioned for selective sliding receipt in a foot receiving cavity 51 provided between bridge member 47 and the valleys 52 formed between adjacent support ribs 26 of support member 24. Cavity 51 is formed for receipt of the transverse cross-section dimension of foot portion 50. Hence, FIG. 1 illustrates that holding device 35 can be selectively positioned closer or further away from the user depending upon which foot receiving cavity 51 is chosen.

Alternatively, holding device 35 may be provided by a telescopic holding arm 48 (FIGS. 5 and 6) pivotally mounted to support surface 27 for pivotal motion between a stowed position (broken lines in FIGS. 5 and 6) and a deployed position (solid lines in FIGS. 5 and 6). In the deployed position, holding arm 48 is oriented in an upstanding position so that documents (not shown) can be mounted to clip portion 49 thereof during keyboard use. In the stowed position, holding arm 48 is generally position flush against or adjacent support surface 27 for transport. Further, the telescopic capability of holding arm 48 permits the holding arm to be stowed between the first and second lips 30, 31, respectively.

In accordance with the present invention, holding device 35 includes an elongated first arm 53 supporting a clip portion 49 at an upper end for holding documents. An elongated second arm 54 telescopically receives an opposite lower end of first arm 53 for telescopic extension and retraction of clip portion 49 relative second arm 54. An opposite lower end of second arm 54 is pivotally secured to a base portion 55, mounted to support surface 27, for movement between the stowed and deployed positions.

In another alternative embodiment of the present invention, as viewed in FIGS. 5 and 6, tray assembly 20, in addition to platform member 21 and support member 24, includes a relatively thin engaging member 56 slidably positioned atop support member 24. The length adjustable support surface 27 is then aggregately provided by ribbed topside surface 32 of support member 24 and a second ribbed topside surface 57 of engaging member 56.

An underside engaging surface 60 of engaging member 56 forms a plurality of shallow, parallel engaging ribs 61 laterally spaced-apart thereacross. Similar to the strengthening and sliding ribs, engaging ribs 61 extend longitudinally along engaging member 56 from one side to an opposite side thereof. These engaging ribs 61 are further formed for sliding interengagement with the topside surface of support ribs 26 of the support member in a manner substantially preventing lateral motion of the engaging member laterally along the support member.

Further, this sliding interengagement provides longitudinal sliding support for selective placement of engaging member 56 relative platform member 21 between the retracted position and the extended position.

Coupled with the selective placement of support member 24 between the retracted and extended position, relative platform member 21, the aggregate support surface 27 can be increased or decreased in length. FIG. 5 illustrates that support member 24 and engaging member 56 can move in opposite directions to lengthen the substantially flat support surface 27.

This configuration enables the upstanding first and second lips 30, 31, both mounted to the bottom platform member 21, to be oriented central the support surface when support surface 27 is moved to the extended position. Hence, central support to a laptop computer (not shown) may always be provided.

A T-shaped coupling mechanism 37 may be employed to couple the engaging member, the support member and the platform member in sliding engagement relative one another.

What is claimed is:

1. An adjustable length portable computer tray assembly comprising:

a relatively thin platform member having a contacting surface and defining a plurality of relatively shallow, parallel, strengthening ribs which are laterally spaced-apart across said platform member and extending longitudinally therealong;

a relatively thin support member having a top sliding surface and a bottom sliding surface each defining a plurality of relatively shallow, parallel, support ribs which are laterally spaced-apart across said support member, said support ribs of said bottom sliding surface being formed for sliding interengagement with said strengthening ribs of said platform member in a manner substantially preventing lateral motion of said support member laterally along said platform member while providing longitudinal sliding support for selectively positioning between a retracted position and an extended position;

a relatively thin engaging member having an engaging surface defining a plurality of relatively shallow, parallel, engaging ribs which are laterally spaced-apart across said engaging member, said engaging ribs of said bottom sliding surface being formed for sliding interengagement with said support ribs of top sliding surface in a manner substantially preventing lateral motion of said engaging member laterally along said support member while providing longitudinal sliding support for selectively positioning between a retracted position and an extended position, said support member and said engaging member aggregately cooperating to provide a substantially flat, length adjustable support surface; and an upstanding first lip and an opposite upstanding second lip each extending upwardly from said support surface, and each extending longitudinally along one of said platform member, said support member and said engaging member, on opposed sides of said support surface.

2. The tray assembly as defined in claim 1 further including:

a first coupling mechanism operable coupling said support member to said platform member for sliding movement between said extended position and said retracted position; and a second coupling mechanism operable coupling said engaging member to said support member for sliding movement between said open position and said closed position.

3. The tray assembly as defined in claim 1 wherein, movement of said support member toward said extended position, and movement of said engaging member toward said open position, are in opposite directions.

4. The tray assembly as defined in claim 3 wherein, said first lip and said second lip extend upwardly from said platform member.

5. The tray assembly as defined in claim 1 wherein, said contacting ribs, said strengthening ribs and said engaging ribs are substantially planar on respective topsides and bottomsides thereof.

6. An adjustable length portable computer tray assembly comprising:

a relatively thin platform member having a contacting surface defining a plurality of relatively shallow, parallel, strengthening ribs laterally spaced-apart across said platform member and extending longitudinally therealong;

a relatively thin support member having a sliding surface defining a plurality of relatively shallow, parallel, support ribs laterally spaced-apart across said support member and formed for longitudinal sliding interengagement with said strengthening ribs of said platform member for selective positioning of said support member relative platform member between a retracted position and an extended position such that said platform member and said support member aggregately cooperate to form a substantially flat, length adjustable support surface, said interengagement further substantially preventing lateral movement of said support member relative said platform member; and a coupling mechanism operable coupling said support member to said platform member, and including a pair of edge receiving slots defined in and extending longitudinally along said support member on opposed sides of said support surface, said receiving slots being formed and dimensioned for sliding receipt of opposed edges of said platform member during sliding movement therebetween between said retracted position and said extended position.

7. The tray assembly as defined in claim 6, and an upstanding first lip and an opposite upstanding second lip each extending upwardly from said support surface, and each extending longitudinally along one of said platform member and said support member on opposed sides of said support surface.

8. The tray assembly as defined in claim 6 wherein, said coupling mechanism includes a detent member protruding from one of said sliding surface and said contacting surface, and a mating recess formed in the other of said contacting surface and said sliding surface for sliding receipt therein during sliding movement of said support member relative said platform member.

9. The tray assembly as defined in claim 6 wherein, said coupling mechanism includes a slot extending longitudinally along one of said sliding surface and said contacting surface, and a T-shaped connecting member formed in the other of said contacting surface and said sliding surface for sliding receipt in said slot during sliding movement of said support member relative said platform member.

10. The tray assembly as defined in claim 6 wherein, said support member includes an upstanding first lip and an opposite upstanding second lip each extending upwardly from and longitudinally along of said support surface on opposed sides thereof, each said first lip and said second lip extending proximate one respective receiving slot of said pair of said receiving slots.

11. The tray assembly as defined in claim 6, wherein, said support ribs and said strengthening ribs are substantially planar on respective topsides and bottomsides thereof.

12. The tray assembly as defined in claim 6 further including:

a bridge member extending laterally across the support surface between said first lip and said second lip; and a removable document holding arm having a foot portion dimensioned for selective sliding receipt in one of a plurality of slots formed between said bridge member and a valley provided between two adjacent ribs of said one of the platform member and the support member.

13. The tray assembly as defined in claim 6 further including:

a document holding device mounted to said support surface.

14. The tray assembly as defined in claim 13 wherein, said holding device includes a base portion mounted to said support surface, a first arm formed for holding documents, and a second arm formed at one end for telescopic engagement with said first arm and an opposite end pivotally mounted to base portion for movement between a stowed position and a deployed position.

15. The tray assembly as defined in claim 6 wherein, said support ribs and said strengthening ribs are substantially planar on respective topsides and bottomsides thereof.

16. The tray assembly as defined in claim 6 wherein, said platform member and said support member are formed from continuous sheets.

17. The tray assembly as defined in claim 6 wherein, adjacent strengthening ribs and adjacent support ribs are of alternating height.

18. An adjustable length portable computer tray assembly comprising:

a relatively thin platform member having a contacting surface defining a plurality of relatively shallow, parallel, strengthening ribs laterally spaced-apart across said platform member and extending longitudinally therealong;

a relatively thin support member having a sliding surface defining a plurality of relatively shallow, parallel, support ribs laterally spaced-apart across said support member and formed for longitudinal sliding interengagement with said strengthening ribs of said platform member for selective positioning of said support member relative said platform member between a retracted position and an extended position such that said platform member and said support member aggregately cooperate to form a substantially flat, length adjustable support surface, said interengagement further substantially preventing lateral movement of said support member relative said platform member, said support member further including an upstanding first lip and an opposite upstanding second lip each extending upwardly from and longitudinally along of said support surface on opposed sides thereof;

a coupling mechanism operable coupling said support member to said platform member for sliding movement between said extended position and said retracted position;

a bridge member extending laterally across the support surface between said first lip and said second lip; and a removable document holding arm having a foot portion dimensioned for selective sliding receipt in one of a plurality of slots formed between said bridge member and a valley provided between two adjacent ribs of said one of the platform member and the support member.

19. An adjustable length portable computer tray assembly comprising:

a relatively thin platform member having a contacting surface defining a plurality of relatively shallow, parallel, strengthening ribs laterally spaced-apart across said platform member and extending longitudinally therealong;

a relatively thin support member having a sliding surface defining a plurality of relatively shallow, parallel, support ribs laterally spaced-apart across said support member and formed for longitudinal sliding interengagement with said strengthening ribs of said platform member for selective positioning of said support member relative said platform member between a retracted position and an extended position such that said platform member and said support member aggregately cooperate to form a substantially flat, length adjustable support surface, said interengagement further substantially preventing lateral movement of said support member relative said platform member;

a coupling mechanism operable coupling said support member to said platform member for sliding movement between said extended position and said retracted position; and a document holding device mounted to said support surface.

20. The tray assembly as defined in claim 19 wherein, said holding device includes a base portion mounted to said support surface, a first arm formed for holding documents, and a second arm formed at one end for telescopic engagement with said first arm and an opposite end pivotally mounted to base portion for movement between a stowed position and a deployed position.

21. The tray assembly as defined in claim 19 wherein, an upstanding first lip and an opposite upstanding second lip each extending upwardly from said support surface, and each extending longitudinally along one of said platform member and said support member on opposed sides of said support surface.

22. The tray assembly as defined in claim 19 wherein, said coupling mechanism further including a detent member protruding from one of said sliding surface and said contacting surface, and a mating recess formed in the other of said contacting surface and said sliding surface for sliding receipt therein during sliding movement of said support member relative said platform member.

23. The tray assembly as defined in claim 19 wherein, said coupling mechanism further including a slot extending longitudinally along one of said sliding surface and said contacting surface, and a T-shaped connecting member formed in the other of said contacting surface and said sliding surface for sliding receipt in said slot during sliding movement of said support member relative said platform member.

24. The tray assembly as defined in claim 19 wherein, said support ribs and said strengthening ribs are substantially planar on respective topsides and bottom sides thereof.

* * * * *